United States Patent
Cooper (10) Patent No.: US 11,372,609 B2
(45) Date of Patent: Jun. 28, 2022

(54) SYSTEM AND METHOD FOR LOCALLY GENERATING DATA

(71) Applicant: DISPLAYLINK (UK) LIMITED, Cambridge (GB)

(72) Inventor: Patrick David Cooper, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 92 days.

(21) Appl. No.: 16/840,821

(22) PCT Filed: Oct. 4, 2018

(86) PCT No.: PCT/GB2018/052832
§ 371 (c)(1),
(2) Date: Apr. 6, 2020

(87) PCT Pub. No.: WO2019/069081
PCT Pub. Date: Apr. 11, 2019

(65) Prior Publication Data
US 2020/0394010 A1    Dec. 17, 2020

(30) Foreign Application Priority Data

Oct. 5, 2017  (GB) .................................. 1716329.6

(51) Int. Cl.
*G06F 3/14*      (2006.01)
*G09G 5/36*     (2006.01)

(52) U.S. Cl.
CPC ............. *G06F 3/1415* (2013.01); *G09G 5/36* (2013.01); *G09G 2320/06* (2013.01);
(Continued)

(58) Field of Classification Search
CPC .......... G09G 2354/00; G09G 2320/06; G09G 3/003; G09G 3/002; G09G 2370/16;
(Continued)

(56) References Cited

U.S. PATENT DOCUMENTS

| 2004/0078821 A1 | 4/2004 | Frisco et al. |
| 2008/0030304 A1* | 2/2008 | Doan ................ H04M 1/72412 340/10.1 |

(Continued)

FOREIGN PATENT DOCUMENTS

WO    2016/182541 A1    11/2016

OTHER PUBLICATIONS

Great Britain Search Report for GB Application No. 1716329.6, dated Mar. 26, 2018, 3 pages.

*Primary Examiner* — Amare Mengistu
(74) *Attorney, Agent, or Firm* — Paradice & Li LLP (57) ABSTRACT

A method provides pre-rendered information messages for display by a peripheral display unit connected to a base station over a data link. The method involves detecting that a data connection between the base station and the peripheral display unit is available, sending pre-rendered information messages from the base station to the peripheral display unit, and storing the pre-rendered information messages at the peripheral display unit for display in response to a status detected at the peripheral display unit. The base station may perform the pre-rendering of information messages in response to variation in configuration information relating to the peripheral display unit. The pre-rendered information messages may be paired with peripheral display unit statuses and the peripheral display unit may be configured so that, in the event that a particular status is detected, the corresponding pre-rendered information message is displayed without requiring data transmission from the base station.

14 Claims, 6 Drawing Sheets

(52) U.S. Cl.
CPC ..... *G09G 2340/14* (2013.01); *G09G 2350/00* (2013.01); *G09G 2354/00* (2013.01); *G09G 2370/16* (2013.01); *G09G 2370/22* (2013.01)

(58) Field of Classification Search
CPC ........... G09G 2350/00; G09G 2340/14; G09G 2370/22; G06F 3/1407; G06F 3/0488
See application file for complete search history.

(56) References Cited

U.S. PATENT DOCUMENTS

| | | | |
|---|---|---|---|
| 2014/0139431 A1* | 5/2014 | Tseng | G06F 3/0488 345/158 |
| 2015/0094142 A1 | 4/2015 | Stafford | |
| 2016/0035312 A1* | 2/2016 | Lee | G06F 9/451 717/174 |
| 2018/0047216 A1* | 2/2018 | Mullins | G06T 19/006 |

* cited by examiner

SYSTEM AND METHOD FOR LOCALLY GENERATING DATA

CROSS-REFERENCE TO RELATED APPLICATIONS

This application is a national phase application of International Application No PCT/GB2018/052832, filed Oct. 4, 2018, which claims priority to Great Britain Patent Application Serial No. 1716329.6, filed Oct. 5, 2017, all of which are incorporated herein by reference.

BACKGROUND

This invention relates to the generation of data for display by peripheral display devices, and in particular to the generation of data for display at times when an external connection to the peripheral display device is not available.

In modern audio-visual display systems, it is common to separate the display elements from the image processing, generation and rendering portions. This separation allows the potentially extremely computationally complex parts of the process to be carried out at a base station (possibly a purpose built one), while the display parts can be offloaded to a peripheral unit. The peripheral unit can be lighter and cheaper thereby making such devices more portable and reducing their cost since they can be configured to unintelligently display the content which is provided to them. The content can be supplied from the base station to the peripheral display unit by a suitable connection, for example, cables, optical fibres, wireless communications, etc. Specific examples of peripheral display devices which fall into this category are projectors and virtual reality (VR) headsets or augmented reality (AR) headsets.

AR and VR devices in particular have large computational loads, as an entire 3D environment must often be generated in real time for display to a user. There is a complex feedback loop between: detected movement of a user's head; generation of a 3D environment; generation of a pair of high quality video streams (one for each eye), correctly rendered for display on the particular headset, with the current settings; and display of the two streams by the headset. Space and weight constraints at the headset mean that the only feasible division of labour between the base station and the headset is to have the base station take on the vast majority of the generating, rendering, motion tracking, etc. and to leave the headset to simply display what it is sent.

A further complication is the current drive towards wireless connectivity. While a convenient development in most cases, in the situation described above it can be problematic to try to send video data over a wireless link, since the usable bandwidth of wireless links is known to fluctuate. Fluctuations in bandwidth available to a peripheral device may be further worsened where such peripheral devices are repositioned, as is often desirable, particularly in AR and VR systems where movement of the user (and correspondingly the AR or VR headset) is often necessary in order to gain a full appreciation of the visual data being displayed.

Sending video content over wireless links can be particularly problematic with respect to reliability of the link, due to the relatively large bandwidths required for transmission of even moderate quality video. For example, an uncompressed 1080p video with a colour depth of 24 bits, being transmitted at a framerate of 60 fps requires nearly 3 Gbit/s. While compression can help alleviate this burden, it is clear that bandwidth fluctuations can cause problems in the smooth transmission of video. In extreme cases, the movement of the device can cause the bandwidth to drop so low that no video can be transmitted at all (or at least not in a reasonable time). Typically, in such cases a series of standard error messages may be stored in memory associated with the peripheral display unit, and shown when a corresponding error is shown. However, as the complexity of peripheral display devices increases, so too do the calculations which need to be performed in order to correctly display images and/or video on them. In particular, each of projectors, AR headsets and VR headsets often have complicated optical systems. These optical systems require substantial rendering to be applied to raw image data to correctly display the image data without distortion effects, some of which may change over time, according to user preference. Moreover, there may be other parameters associated with such error messages, such as the language in which to present the information. It is a problem for designers of such systems to ensure that any necessary error messages can be displayed by the peripheral display unit. The number of different combinations of languages, focusing parameters, etc. is simply too much to store on a peripheral display unit, in which the general drive is towards simplification. Nonetheless, when the data link between the base station and the peripheral display unit is unreliable, the peripheral display unit can end up in a situation in which a particular status to which a user should be alerted is detected, but it is only able to display an inappropriate (e.g. badly rendered, incorrect, etc.) message. In this case, it can either display the inappropriate message or a blank screen, in the hope that the user will be prompted to try to resolve the issue themselves.

The problem is particularly acute in VR systems (and to an extent in AR systems), because the experience is so immersive, meaning that sudden changes in rendering style, quality, focus or indeed the very images displayed (e.g. transitions to a blank screen, or rapidly changing colours) can all result in disorientation, discomfort and nausea. In AR and VR too, the simple solution of using a cable to connect the base station to the peripheral display unit is inappropriate as movement is often required. Moreover, since AR and VR systems tend to be wearable (e.g. headsets), increasing either the storage capacity or computational capacity of the headset is not a practical solution either, due to weight constraints.

SUMMARY

The present invention, as defined by the appended independent claims with preferred features being presented in the dependent claims, aims to address some or all of the above-mentioned problems.

Disclosed herein is a method of providing pre-rendered information messages for display by a peripheral display unit when the peripheral display unit is connected to a base station over a data link, the method comprising: detecting that a data connection between the base station and the peripheral display unit is available; sending pre-rendered information messages from the base station to the peripheral display unit; and storing the pre-rendered information messages at the peripheral display unit, for display in response to a status detected at the peripheral display unit. This arrangement allows the peripheral display unit to obtain pre-rendered information messages for display to a user when a connection is available. The peripheral display unit can then display these images to a user, whether or not the peripheral display unit is able to communicate with the base station. This solution leverages the existing powerful video processing systems to provide the required information messages, correctly rendered for the current display settings and parameters, to the peripheral display unit at times when sufficient signal strength is available to do so. This allows an improved display quality of such messages. In this context a base station may be the entirety of the generating, processing, compressing, rendering and transmitting parts of the system, or it may comprise only some of these parts. For example, in cases where the rendering happens at the base unit, in response to variation in configuration information relating to the peripheral display unit, there need be fewer components communicating with one another to provide the correctly rendered content, and consequently less reliance on transmission across potentially unreliable links. Alternatively, the messages could be provided in a pre-rendered format to the base station. In this scenario, the messages could be sourced from e.g. an internet source such as a server managed by the manufacturer of the headset, and/or the base station and/or a developer of software for these portions of the system. The messages could be provided from such a source to ensure that the most recent variants of the messages are provided to the system.

There are several effects which may require correction by a pre-rendering step, some due to user settings or abilities, while others are due to parameters of the display unit. Mura artefacts are caused by variations in brightness between adjacent pixels, even if they are supposed to be outputting the same brightness, and are caused by random fluctuations in the process of producing display pixels. Rendering settings can be adjusted to minimise the obviousness of this effect to a viewer. The lens system may introduce effects due to chromatic aberration or other focal parameters of the lens system. This can be pre-corrected for by providing a distorted image on the screens, as described in more detail below. In addition to the lens system causing distortions, the display panels themselves may be curved or angled relative to one another or to the sight axis of a viewer. This effect, particularly when filtered through a lens system as set out above, can require additional pre-rendering to provide the desired images to a viewer. Indeed, even flat lenses may be positioned a variable distance from the user's eyes (e.g. to improve user comfort), which may require the rendering parameters to be varied to account for this. Depending on the design of the headset, ambient lighting may be taken into account, for example to increase brightness output by the panels if the ambient lighting is bright, so as to ensure that the images displayed are visible.

In addition, the user may have various accessibility requirements which affect how messages are to be displayed. For example, the user may have visual impairment, colour blindness, astigmatism, issues with the retina or other eye parts, macular degeneration, etc., all of which may require adjustments to the arrangement of images or image colours to be displayed, and which can be at least partly corrected for by pre-rendering accordingly. In some cases, the pre-rendering may include enhancing brightness or saturation towards the centre of the displayed image. In some cases, it can be helpful to think of the lens system as extending to include also prescription eyewear (glasses, contact lenses, etc.) that a user may be wearing. The user may adjust the display parameters (and therefore the rendering parameters) to account for this. In some cases, the user may make an adjustment (with corresponding rendering parameter adjustments) to adapt the headgear to their inter-pupillary distance.

There may be different rendering settings based on circumstances or user information. For example, information may be modified before being displayed to a child or adult with learning difficulties. In another example, where the display unit is being used to train a user (e.g. in counter terrorism, paramedic, firefighting, etc.), a flag may be set to present slightly different information in the event of an error, to ensure that the user is aware that the error message is not part of the training or simulation, but relates to a real-world event.

Additional parameters to take into account for rendering steps are ones related to user activity. For example, if it is known that the current display data is likely to require a large amount of movement from the user, it may be desirable to alter how messages are displayed, e.g. but causing them to slowly fade into view, since rapid changes in perceived movement (especially in VR situations) can cause nausea and disorientation. In some cases, a user may lose their balance if there is a rapid transition from fast movement to no movement. Likewise, if the data being presented is typically very dark, a bright message could be jarring and painful to a user. This could be predicted and adjusted for, for example by providing a dimmer message image the than the usual brightness. In some circumstances a very bright average data may result in a brighter than average message being displayed, for similar reasons. General information about the typical scene likely to be encountered may be provided, for example by considering an entropic measure of the "busyness" of the background.

Optionally, the pre-rendered information messages are stored in a non-volatile memory at the peripheral display unit. The use of non-volatile memory allows the correctly rendered messages to be stored in the memory of the peripheral display unit in such a way that shutting down the peripheral display unit will not erase the correctly rendered messages, nor will accidental or deliberate powering down of the peripheral display unit.

In some examples, the messages are stored with a priority. This priority can be used, for example to determine which messages are stored in non-volatile memory. For example, the messages which are most likely to be needed before a connection has been established with the base station, or most likely to be needed when the connection fails, could be stored in the non-volatile memory. Other messages are more likely to be able to be sought prior to being needed, so need not be stored in non-volatile memory. Other ranking systems could be used to determine where to store messages, such as how common those messages are.

In some cases the pre-rendered information messages are paired with peripheral display unit statuses and the peripheral display unit is configured so that, in the event that a particular status is detected, the corresponding pre-rendered information message is displayed without requiring data transmission from the base station. This allows a user to be correctly alerted to a wide variety of statuses even when there is no connection available. Examples of such statuses and messages include:

No connection is available. This is a key case where it is important that the message be provided in advance, since it will not be possible to render this message correctly when the error occurs.

Low bandwidth. For similar reasons as set out above, this is important to have in advance.

No data detected. In the case where the connection is (or appears to be) working correctly, but data is nonetheless not being received, it will be impossible to render messages to alert a user to this.

Base station and display unit are incompatible. In some cases, it may be that these two parts of the system cannot communicate with one another adequately to render the data required of them. They may nevertheless have an emergency set of parameters which can be used to provide a readable message to a user to alert them to the problem.

System damage. Part or all of the system may suffer an error (e.g. due to software updates or physical damage) which prevents further communication.

Antennae misaligned. In this case, the connection quality may be reduced (resulting in a specific case of the above errors).

Proximity/out of bounds. The user may be reaching the edge of the usable region (in the real world), either due to communication (e.g. line of sight) limitations or due to physical space limitations (the room they are in is too small).

Overheating. One or more parts of the system may be about to shut down or otherwise fail.

Fire/system alarm. Alert the user to events outside of the virtual world.

Headphones not present.

Microphone muted.

Audio in/out interrupted.

Session expired/insert more money or tokens/unauthorised access. For pay per hour systems etc. there may be a need to alert a user to the situation when a host system is configured to shut down after a certain time, etc.

Host system restarting/updating/busy. Where the host is required to restart, update, or generally be busy doing something else, the user should be able to be alerted, since the host may be unresponsive at such times.

Power system failure/critical.

Fingerprint/voice recognition request. In case a user finds themselves locked out of the host.

Too many devices on the same radio channel (channel congestion). This would be a special case of the low bandwidth case above.

In any of the above cases, the message may include suggestions such as "move closer to base station" or "check for line-of-sight obstacles" to try to remedy the situation, in addition to alerting the user to the situation. Audio channels may be used to back up or add to the messages sent. Audio streams could be sampled and sent to the device to be stored for the above scenarios too. This could be used in situations where the image should not be interrupted, or if the user has accessibility issues, or if the display panel is reporting problems/is missing, or if the event is particularly critical, e.g. fire alarm.

The pre-rendered information messages may be error messages and the statuses may be error statuses. This is particularly important as many errors may make it impossible for the peripheral display unit to contact the base station (or indeed anything else). Consequently, it is advantageous to prepare in advance for such error statuses by pre-loading error messages to prompt a user to take corrective action. In particular when there is no signal available due to the unreliable link, it is important to be able to inform a user of this, so that they can move the peripheral display unit in an attempt to re-establish the connection. It is important that such a message is correctly rendered as in extreme cases it may be impossible to read a poorly rendered message, leaving the user in no better of a situation than a blank screen would have. Situations may even arise in which the peripheral display unit does not know what the solution is. In these cases, it may be advantageous to have a default error message to revert to. This may be an instruction to move the display unit closer to the base station in an attempt to improve the communications link, so that the base station can be interrogated (possibly even utilising a connection to the internet to help resolve the issue), for example.

In some cases the peripheral display unit is configured to send information messages to be rendered to the base unit once availability of a connection between the peripheral display unit and the base station is detected. This allows a peripheral display unit to be provided with a set of messages which might be useful to it, i.e. to cover the various situations envisaged by the manufacturer. When a communications link is available, the peripheral display unit can send these messages to the base station which performs operations on the basic images to render them for display by the peripheral display unit, before sending the rendered images back to the peripheral display unit.

Additionally or alternatively, the base station may be configured to determine messages for sending to the peripheral display unit. This allows the base station to provide the peripheral display unit with additional information for display, which may not have been available to the peripheral display unit at the time it was manufactured. The peripheral display unit may be given the opportunity to accept or reject message proposals. In the event that the messages are to be sent to the peripheral display unit, the rendering of the messages can occur in the same manner as that set out above. The proposed messages may be paired with status conditions, as described above. In some cases, this pairing may include additional, non-visible information for the peripheral display unit, to tell it how to determine when the corresponding status has occurred, for example.

The pre-rendering may take account of one or more of: language settings of the base unit and/or the peripheral display unit; chromatic aberration of the peripheral display unit optics; focal parameters of the peripheral display unit optics; brightness variation in pixels (e.g. mura artefacts); other display parameters of the peripheral display unit; and/or one or more parameters of image or video data currently being displayed by the peripheral display unit. Each of these is important for ensuring that the message can be seen and correctly interpreted by a user. For example if a user only speaks English, then messages in Chinese will be of no use to them. A user may have set their language preferences on the base station, so there is no way that the peripheral display unit would know which language to present the messages in without communicating with the base station. Similarly, different peripheral display units each of which are compatible with the base station may nonetheless require different rendering to account for differences in their optical systems and/or user preferences. When the peripheral display unit connects to the base station, part of the handshaking and verification stage can include the peripheral display unit transmitting some of these parameters to the base station to allow the base station to correctly render the images or video. Lastly, it is possible that the information message to be overlaid on the display may need to be adapted to the other video data being sent. For example, in order to read text on a background, the text should contrast with the background, so the message rendering may take into account average pixel colours, most common pixel colours (or colour ranges) average brightness, etc. to maximise comfort or minimise discomfort from jarring colour combinations or brightness transitions. In addition, the corrections required to correctly display information to a user to account for curved or angled panels, distance of a display panel from a viewer's eyes, ambient light levels, accessibility requirements, inter-pupillary distance, user or circumstantial factors, and/or motion or location of a user.

The method described above may be executed every time a connection is available. This ensures that the most up to date settings are used.

Additionally or alternatively, pre-rendered information messages are sent in response to the base station and/or the peripheral display unit being initialised. In other words, when the base station and/or peripheral display unit is switched on and loaded up (i.e. booted), there may be additional messages sent to supplement the existing messages or replace the entire set. This provides a good periodic update to the system, and also allows the message display settings to be reset to default values in the event that any display parameters of the system are also reset to their defaults.

Additionally or alternatively, the method may be executed after software for the base station and/or the peripheral display unit has been updated. This allows the messages to be correctly rendered in the event that any relevant settings are changed in a software update. This is particularly important as error statuses may sometimes be more likely just after a software update.

Additionally or alternatively, the method may be executed after a language setting for the base station and/or the peripheral display unit has been changed. As discussed above, the language in which a message is presented can be critical to prompting a user to take the desired action. Similarly, the method may be executed after a graphical display setting has been changed. As set out above, the graphical display settings can be key to getting the message to display in the desired manner to allow it to be correctly read by a user. In AR and VR, this is particularly important, since out of focus or otherwise poorly rendered images are known to cause discomfort and nausea in users.

Additionally or alternatively, the pre-rendered information messages stored on the peripheral display unit may be updated when a change in one or more parameters of image or video data currently being displayed by the peripheral display unit is detected. The parameters may relate to average brightness or colour parameters, for example. This can allow messages to be provided with the most up to date information about the makeup of a typical visual frame. Consequently, an appropriate level of contrast and non-jarring colour and brightness combinations can be ensured.

Additionally or alternatively the method may be executed in response to detection of a particular status by the base station and/or the peripheral display unit. This allows, for example, the peripheral display unit to detect that it has accidentally deleted or overwritten one or all of the messages, and to request that it be sent replacements.

Additionally or alternatively, the method may be executed periodically. This can ensure that the messages are kept up to date, even if none of the other triggering events discussed above occur.

In each of the above examples in which the method is repeated based on some trigger, the new pre-rendered messages which are sent when the method is repeated will also be stored in the peripheral display unit memory. In some cases, these will overwrite the previous equivalent messages. In other cases, they may be stored in addition to the existing messages. Clearly, this latter case will eventually fill the available storage space. Consequently, the peripheral display unit may delete the oldest messages to make way for the new. Alternatively it may delete the least used messages to make space for the new messages.

Also disclosed herein is a system for providing pre-rendered information messages for display by a peripheral display unit when the base station and the peripheral display unit are connected to one another over a data link, the system comprising: a base station; a peripheral display unit having a memory; and a data link between the a base station and the a peripheral display unit; and wherein in the event that the peripheral display unit and/or the base station detect(s) that a connection is available between the base station and the peripheral display unit is available, the system is configured to trigger sending of pre-rendered information messages from the base station to the peripheral display unit; and wherein the peripheral display unit is configured to store the pre-rendered information messages in the memory, and to display the pre-rendered information messages in response to a status detected at the peripheral display unit. This arrangement allows the peripheral display unit to obtain pre-rendered information messages for display to a user when a connection is available. The peripheral display unit can then display these images to a user, whether or not the peripheral display unit is able to communicate with the base station. This solution leverages the existing powerful video processing systems to provide the required information messages, correctly rendered for the current display settings and parameters, to the peripheral display unit at times when sufficient signal strength is available to do so. This allows an improved display quality of such messages. In this context a base station may be the entirety of the generating, processing, compressing, rendering and transmitting parts of the system, or it may comprise only some of these parts. For example, in cases where the rendering happens at the base unit, in response to variation in configuration information relating to the peripheral display unit, there need be fewer components communicating with one another to provide the correctly rendered content, and consequently less reliance on transmission across potentially unreliable links. Alternatively, the messages could be provided in a pre-rendered format to the base station. In this scenario, the messages could be sourced from e.g. an internet source such as a server managed by the manufacturer of the headset, and/or the base station and/or a developer of software for these portions of the system. The messages could be provided from such a source to ensure that the most recent variants of the messages are provided to the system.

There are several effects which may require correction by a pre-rendering step, some due to user settings or abilities, while others are due to parameters of the display unit. Mura artefacts are caused by variations in brightness between adjacent pixels, even if they are supposed to be outputting the same brightness, and are caused by random fluctuations in the process of producing display pixels. Rendering settings can be adjusted to minimise the obviousness of this effect to a viewer. The lens system may introduce effects due to chromatic aberration or other focal parameters of the lens system. This can be pre-corrected for by providing a distorted image on the screens, as described in more detail below. In addition to the lens system causing distortions, the display panels themselves may be curved or angled relative to one another or to the sight axis of a viewer. This effect, particularly when filtered through a lens system as set out above, can require additional pre-rendering to provide the desired images to a viewer. Indeed, even flat lenses may be positioned a variable distance from the user's eyes (e.g. to improve user comfort), which may require the rendering parameters to be varied to account for this. Depending on the design of the headset, ambient lighting may be taken into account, for example to increase brightness output by the panels if the ambient lighting is bright, so as to ensure that the images displayed are visible.

In addition, the user may have various accessibility requirements which affect how messages are to be displayed. For example, the user may have visual impairment, colour blindness, astigmatism, issues with the retina or other eye parts, macular degeneration, etc., all of which may require adjustments to the arrangement of images or image colours to be displayed, and which can be at least partly corrected for by pre-rendering accordingly. In some cases, the pre-rendering may include enhancing brightness or saturation towards the centre of the displayed image. In some cases, it can be helpful to think of the lens system as extending to include also prescription eyewear (glasses, contact lenses, etc.) that a user may be wearing. The user may adjust the display parameters (and therefore the rendering parameters) to account for this. In some cases, the user may make an adjustment (with corresponding rendering parameter adjustments) to adapt the headgear to their inter-pupillary distance.

There may be different rendering settings based on circumstances or user information. For example, information may be modified before being displayed to a child or adult with learning difficulties. In another example, where the display unit is being used to train a user (e.g. in counter terrorism, paramedic, firefighting, etc.), a flag may be set to present slightly different information in the event of an error, to ensure that the user is aware that the error message is not part of the training or simulation, but relates to a real-world event.

Additional parameters to take into account for rendering steps are ones related to user activity. For example, if it is known that the current display data is likely to require a large amount of movement from the user, it may be desirable to alter how messages are displayed, e.g. but causing them to slowly fade into view, since rapid changes in perceived movement (especially in VR situations) can cause nausea and disorientation. In some cases, a user may lose their balance if there is a rapid transition from fast movement to no movement. Likewise, if the data being presented is typically very dark, a bright message could be jarring and painful to a user. This could be predicted and adjusted for, for example by providing a dimmer message image the than the usual brightness. In some circumstances a very bright average data may result in a brighter than average message being displayed, for similar reasons. General information about the typical scene likely to be encountered may be provided, for example by considering an entropic measure of the "busyness" of the background.

Optionally, the memory is a non-volatile memory. The use of non-volatile memory allows the correctly rendered messages to be stored in the memory of the peripheral display unit in such a way that shutting down the peripheral display unit will not erase the correctly rendered messages, nor will accidental or deliberate powering down of the peripheral display unit.

In some cases, the pre-rendered information messages are paired with peripheral display unit statuses and the peripheral display unit is configured so that, in the event that a particular status is detected, the corresponding pre-rendered information message is displayed without requiring data transmission from the base station. This allows a user to be correctly alerted to a wide variety of statuses even when there is no connection available. Examples of such statuses and messages include:

No connection is available. This is a key case where it is important that the message be provided in advance, since it will not be possible to render this message correctly when the error occurs.

Low bandwidth. For similar reasons as set out above, this is important to have in advance.

No data detected. In the case where the connection is (or appears to be) working correctly, but data is nonetheless not being received, it will be impossible to render messages to alert a user to this.

Base station and display unit are incompatible. In some cases, it may be that these two parts of the system cannot communicate with one another adequately to render the data required of them. They may nevertheless have an emergency set of parameters which can be used to provide a readable message to a user to alert them to the problem.

System damage. Part or all of the system may suffer an error (e.g. due to software updates or physical damage) which prevents further communication.

Antennae misaligned. In this case, the connection quality may be reduced (resulting in a specific case of the above errors).

Proximity/out of bounds. The user may be reaching the edge of the usable region (in the real world), either due to communication (e.g. line of sight) limitations or due to physical space limitations (the room they are in is too small).

Overheating. One or more parts of the system may be about to shut down or otherwise fail.

Fire/system alarm. Alert the user to events outside of the virtual world.

Headphones not present.

Microphone muted.

Audio in/out interrupted.

Session expired/insert more money or tokens/unauthorised access. For pay per hour systems etc. there may be a need to alert a user to the situation when a host system is configured to shut down after a certain time, etc.

Host system restarting/updating/busy. Where the host is required to restart, update, or generally be busy doing something else, the user should be able to be alerted, since the host may be unresponsive at such times.

Power system failure/critical.

Fingerprint/voice recognition request. In case a user finds themselves locked out of the host.

Too many devices on the same radio channel (channel congestion). This would be a special case of the low bandwidth case above.

In any of the above cases, the message may include suggestions such as "move closer to base station" or "check for line-of-sight obstacles" to try to remedy the situation, in addition to alerting the user to the situation. Audio channels may be used to back up or add to the messages sent. Audio streams could be sampled and sent to the device to be stored for the above scenarios too. This could be used in situations where the image should not be interrupted, or if the user has accessibility issues, or if the display panel is reporting problems/is missing, or the event is particularly critical, e.g. fire alarm.

The pre-rendered information messages may be error messages and the statuses may be error statuses. This is particularly important as many errors may make it impossible for the peripheral display unit to contact the base station (or indeed anything else). Consequently it is advantageous to prepare in advance for such error statuses by pre-loading error messages to prompt a user to take corrective action. In particular when there is no signal available due to the unreliable link, it is important to be able to inform a user of this, so that they can move the peripheral display unit in an attempt to re-establish the connection. It is important that such a message is correctly rendered as in extreme cases it may be impossible to read a poorly rendered message, leaving the user in no better of a situation than a blank screen would have. Situations may even arise in which the peripheral display unit does not know what the solution is. In these cases, it may be advantageous to have a default error message to revert to. This may be an instruction to move the display unit closer to the base station in an attempt to improve the communications link, so that the base station can be interrogated (possibly even utilising a remote server, e.g. via a connection to the internet, to help resolve the issue), for example.

In some cases the peripheral display unit is configured to send messages to be rendered to the base unit in the event that availability of a connection between the peripheral display unit and the base station is detected. This allows a peripheral display unit to be provided with a set of messages which might be useful to it, i.e. to cover the various situations envisaged by the manufacturer. When a communications link is available, the peripheral display unit can send these messages to the base station which performs operations on the basic images to render them for display by the peripheral display unit, before sending the rendered images back to the peripheral display unit.

Additionally or alternatively, the base station may be configured to determine messages for sending to the peripheral display unit. This allows the base station to provide the peripheral display unit with additional information for display, which may not have been available to the peripheral display unit at the time it was manufactured. The peripheral display unit may be given the opportunity to accept or reject message proposals. In the event that the messages are to be sent to the peripheral display unit, the rendering of the messages can occur in the same manner as that set out above. The proposed messages may be paired with status conditions, as described above. In some cases, this pairing may include additional, non-visible information for the peripheral display unit, to tell it how to determine when the corresponding status has occurred, for example.

The pre-rendering may take account of one or more of: language settings of the base unit and/or the peripheral display unit; chromatic aberration of the peripheral display unit optics; focal parameters of the peripheral display unit optics; brightness variation in pixels (e.g. mura artefacts); other display parameters of the peripheral display unit; and/or one or more parameters of image or video data currently being displayed by the peripheral display unit. Each of these is important for ensuring that the message can be seen and correctly interpreted by a user. For example if a user only speaks English, then messages in Chinese will be of no use to them. A user may have set their language preferences on the base station, so there is no way that the peripheral display unit would know which language to present the messages in without communicating with the base station. Similarly, different peripheral display units each of which are compatible with the base station may nonetheless require different rendering to account for differences in their optical systems and/or user preferences. When the peripheral display unit connects to the base station, part of the handshaking and verification stage can include the peripheral display unit transmitting some of these parameters to the base station to allow the base station to correctly render the images or video. Lastly, it is possible that the information message to be overlaid on the display may need to be adapted to the other video data being sent. For example, in order to read text on a background, the text should contrast with the background, so the message rendering may take into account average pixel colours, most common pixel colours (or colour ranges) average brightness, etc. to maximise comfort or minimise discomfort from jarring colour combinations or brightness transitions. In addition, the corrections required to correctly display information to a user to account for curved or angled panels, distance of a display panel from a viewer's eyes, ambient light levels, accessibility requirements, inter-pupillary distance, user or circumstantial factors, and/or motion or location of a user.

The system may be configured to send pre-rendered information messages to the peripheral display unit every time a connection is available. This ensures that the most up to date settings are used.

Additionally or alternatively, the system may be configured to send pre-rendered information messages to the peripheral display unit every time the base station and/or the peripheral display unit is initialised. In other words, when the base station and/or peripheral display unit is switched on and loaded up (i.e. booted), there may be additional messages sent to supplement the existing messages or replace the entire set. This provides a good periodic update to the system, and also allows the message display settings to be reset to default values in the event that any display parameters of the system are also reset to their defaults.

Additionally or alternatively, the system may be configured to send pre-rendered information messages to the peripheral display unit after software for the base station and/or the peripheral display unit has been updated. This allows the messages to be correctly rendered in the event that any relevant settings are changed in a software update. This is particularly important as error statuses may sometimes be more likely just after a software update.

Additionally or alternatively, the system may be configured to send pre-rendered information messages to the peripheral display unit after a language setting for the base station and/or the peripheral display unit has been changed. As discussed above, the language in which a message is presented can be critical to prompting a user to take the desired action. Similarly, the system may be configured to send pre-rendered information messages to the peripheral display unit after a graphical display setting has been changed. As set out above, the graphical display settings can be key to getting the message to display in the desired manner to allow it to be correctly read by a user. In AR and VR, this is particularly important, since out of focus or otherwise poorly rendered images are known to cause discomfort and nausea in users.

Additionally or alternatively, the system may be configured to send pre-rendered information messages to the peripheral display unit to update the pre-rendered information messages stored on the peripheral display unit in the event that a change in one or more parameters of image or video data currently being displayed by the peripheral display unit is detected. The parameters may relate to average brightness or colour parameters, for example. This can allow messages to be provided with the most up to date information about the makeup of a typical visual frame. Consequently, an appropriate level of contrast and non-jarring colour and brightness combinations can be ensured.

Additionally or alternatively, the system may be configured to send pre-rendered information messages to the peripheral display unit in response to detection of a particular status by the base station and/or the peripheral display unit. This allows, for example, the peripheral display unit to detect that it has accidentally deleted or overwritten one or all of the messages, and to request that it be sent replacements.

Additionally or alternatively, the system may be configured to periodically send pre-rendered information messages to the peripheral display unit. This can ensure that the messages are kept up to date, even if none of the other triggering events discussed above occur.

In each of the above examples in which the system is configured to send pre-rendered messages based on some trigger, the new pre-rendered messages which are sent will also be stored in the peripheral display unit memory. In some cases, these will overwrite the previous equivalent messages. In other cases, they may be stored in addition to the existing messages. Clearly, this latter case will eventually fill the available storage space. Consequently, the peripheral display unit may delete the oldest messages to make way for the new. Alternatively it may delete the least used messages to make space for the new messages.

The method and/or system described above may also include features which decide how to deal with sending the pre-rendered information messages when other data is also being sent. In this case, the other data may comprise video and/or audio data, for example, for display by the peripheral display device. The pre-rendered information messages may be sent in preference to other data. For example, the system may decide that the sending of some or all of the messages is more important than the sending of other data. This may occur when the link is very unreliable and the system urgently needs to alert a user of this fact, for example, so that the user can address the issue quickly. In any case, since such messages may form only a single frame (or indeed only a portion of a frame), the messages can be prioritised and only the most important messages be sent by dropping relatively few frames in preference to sending the messages.

In some cases, the messages are sent concurrently with data. For example, the messages can be packaged with the data. In this case, a header associated with the data and/or the messages may be modified to alert the peripheral display unit to the presence of the messages. This provides a convenient manner in which the sending of messages can be included in the normal data stream, requiring only minimal modification of the existing data transfer protocols.

Additionally or alternatively, the method may include detecting the bandwidth availability of the connection once availability of a connection between the peripheral display unit and the base station is detected. In the event that the available bandwidth of the connection is insufficient for both the messages and the data, bandwidth allocated for sending the messages may be reduced. Additionally or alternatively, in the event that the available bandwidth of the connection is insufficient for both the messages and the data, sending of the messages may be delayed until the detected bandwidth is larger than a predetermined threshold. Additionally or alternatively, in the event that the available bandwidth of the connection is insufficient for both the messages and the data, bandwidth allocated for sending the data may be reduced.

The above additional method steps, while loosely presented as method steps, can also form part of the system. For example the system described herein can be configured to perform these method steps, in addition to some or all of the functions of the system described elsewhere.

Additionally, in each of the above examples, while the bulk of the rendering is performed by the base station, some of the examples may be benefitted by the peripheral display unit performing some of the rendering. For example, where the message to be displayed is provided as a transparent overlay, the exact background image will be an important factor in displaying the message as intended. Merging the message with the background is an example of rendering which may be performed at least in part at the peripheral display unit. Similarly, where things like the brightness or busyness of the background is factored into the displayed message, a degree of local rendering at the peripheral display unit may be beneficial in displaying the image as intended.

To assist in this, the peripheral display unit may have the ability to determine locally the busyness, brightness or other parameters of the images being displayed, and to use this information in the process set out above. For example, these measured parameters may be supplied to the base station for factoring into the rendering performed there, or the peripheral display unit may use them to locally adjust the pre-rendered images. Lastly, the display unit may use the measured parameters to select from a range of pre-rendered images (e.g. a dark or a light version to improve the contrast, for example).

BRIEF DESCRIPTION OF THE DRAWINGS

Specific embodiments of the invention will now be described with reference to the Figures, in which.

DETAILED DESCRIPTION

Figure 1A:
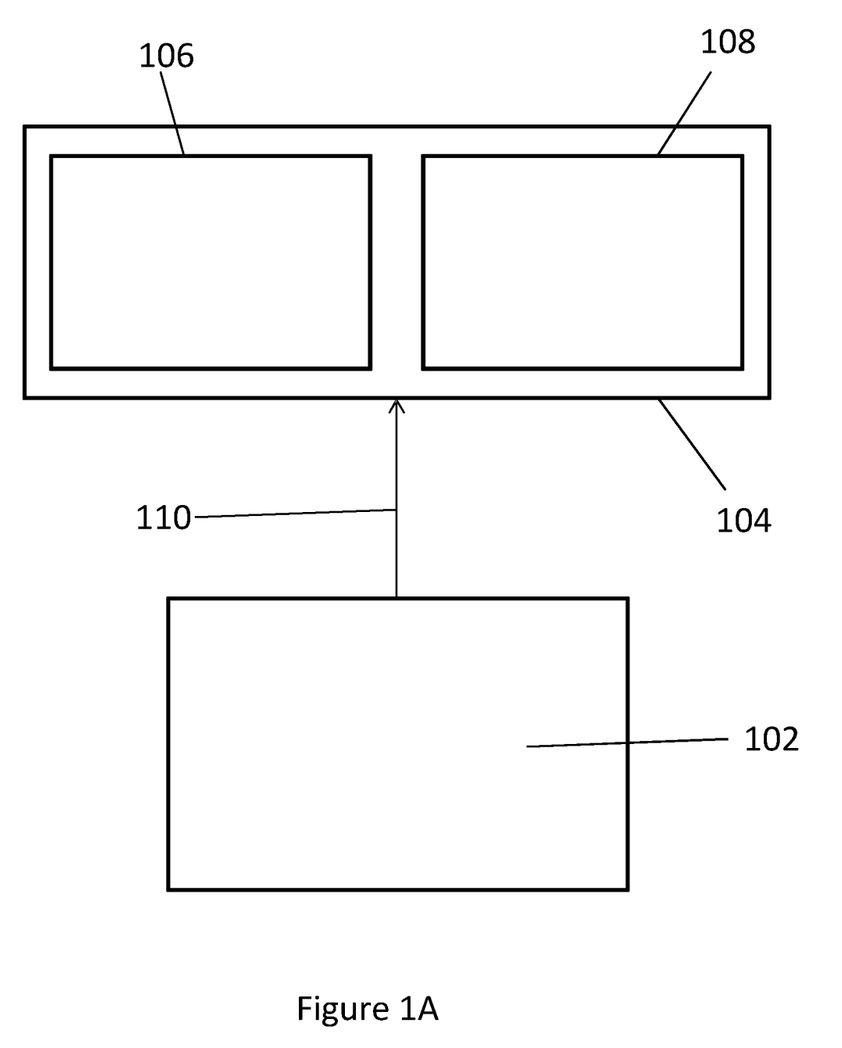
FIG. 1A shows a schematic of a virtual reality or augmented reality headset visual display unit.
Figure 2A:
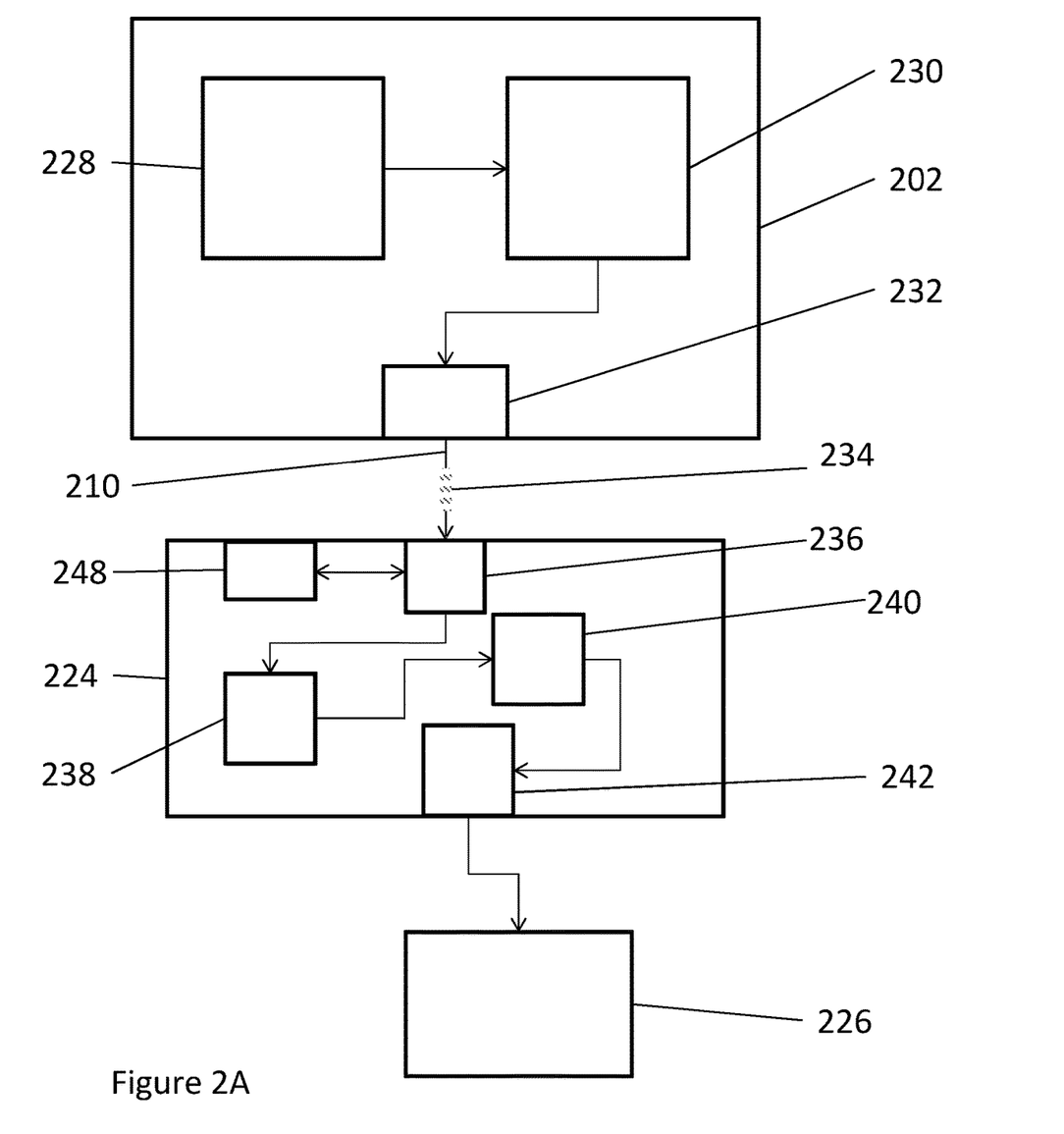
FIG. 2A shows a schematic of a base station and visual display unit.

Turning now to FIG. 1A, which shows a visual display unit in the form of a virtual reality (VR) or augmented reality (AR) headset 104, as illustrated in FIG. 2, connected to a host device 102, which may be a computing device, gaming station, etc. and is an example of a base station from which signals and data are sent. The virtual reality headset 104 incorporates two display panels 106, 108, which may be embodied as a single panel split by optical elements. In use, one display is presented to each of a viewer's eyes. The host device 102 generates image data for display on these panels 106, 108 and transmits the image data to the virtual or augmented reality headset 104.

Augmented reality glasses also have two display panels, each associated with one of the user's eyes, similar to the virtual reality headset 104 shown in FIG. 1A. This example differs in that the display panels are translucent so as to allow a user to view their environment through the panels 106, 108 as normal when no signal is sent. When signal is sent, this is overlaid on the user's view of their environment, modifying that view by adding additional visual information to the user's view, thereby augmenting what would have been seen without the signal being sent.

The host device 102 may be a static computing device such as a computer, gaming console, etc., or may be a mobile computing device such as a smartphone or smartwatch. As previously described, the host device 102 generates or receives image data and transmits the data to the augmented reality glasses or virtual reality headset 104 for display.

The display device may be connected to the host device 102 by a wired or wireless connection. While a wired connection minimises latency in transmission of data from the host to the display, wireless connections give the user much greater freedom of movement within range of the wireless connection and are therefore preferable. A balance must be struck between high compression of data, in particular video data, which can be used to enable larger amounts of data (e.g. higher resolution video) to be transmitted between the host and display, and the latency that will be introduced by processing of the data. In either the wired or the wireless case, the link may be an unreliable link, in which there is a higher than normal incidence of packets or frames being dropped, simply not arriving having been sent, noise interfering with the signal, random bit-flipping, etc.

Ideally, the end-to-end latency between sensing a user's head movement, generating the pixels in the next frame of the VR (virtual reality) scene and streaming the video should be kept below 20 ms, preferably below 10 ms, further preferably below 5 ms.

The wireless link should be implemented as a high bandwidth short-range wireless link, for example at least 1 Gbps, preferably at least 2 Gbps, preferably at least 3 Gbps. An "extremely high frequency (EHF)" radio connection, such as a 60 GHz radio connection is suitable for providing such high-bandwidth connections over short-range links. Such a radio connection can implement the WiFi standard IEEE 802.11ad. The 71-76, 81-86 and 92-95 GHz bands may also be used in some implementations.

The wireless links described above can provide transmission between the host and the display of more than 50 frames per second, preferably more than 60 fps, further preferably more than 90 fps. In some very recent examples, frame rates of 120 fps are being used.

In each of the VR and AR embodiments described above, the aim is to make the user feel immersed in the virtual/augmented environment. Part of this includes providing a lens system between the display panels 106, 108 and a user's eyes to give a feel of a focal depth a few metres from the user (rather than the actual distance of a few centimetres). This extreme change in depth requires strong lenses to be used, and the use of strong lenses in turn enhances various optical aberrations due to the lens system. In order for images or video (henceforth referred to simply as "images", with the understanding that "images" should be taken to include video as well) to be displayed at the desired depth and free from aberrations, the raw images displayed on the display panels 106, 108 are themselves distorted. This distortion is calculated in order that the various optical aberrations introduced by the optical system bring the images back to a desired, undistorted image. The calculation of the correct distortion to apply to the image to correctly display that image is known as rendering (or pre-rendering), and takes as an input raw image data for display and the parameters of the visual display unit (e.g. lens types, strengths, etc.), and outputs a distorted (pre-rendered) image. As such rendering is computationally demanding it is usually performed at a base station (e.g. host device 102). Images in VR/AR systems are usually pre-rendered (that is, supplied to the peripheral display unit already rendered), e.g. by the base station 102.

As will be described in more detail later, the base station 102 and/or the headset may need to communicate statuses directly to a user from time to time. It is important that a user is able to correctly read such statuses with minimal effort, which requires (among other things) that the statuses be presented in a language with which the user is familiar, and that the messages is correctly rendered for display. Moreover, the headset 104 (visual display unit) should be able to display the status messages whether or not it is in communication with the base station 102, since a particularly useful message class may relate to issues with the connection between the base station 102 and the visual display unit 104. For example, it is useful to alert a user that the connection has failed, but in the case of a failed connection, it would be impossible to render such a message correctly. Other messages can also be provided as set out below, which are not strictly dependent on the connection (or lack of), which has the benefit that: (1) all messages are treated the same, thereby simplifying protocols; (2) messages unrelated to the connection health can still be displayed when needed in the event that the occurrence of their corresponding status happens to coincide with a connection failure; and (3) sporadic sending and receiving of unnecessary data over the link is reduced, thereby reducing burdening of the connection and the rendering module since all messages are sent at the same time, rather than in a piecemeal fashion. The headset 104 may be configured to detect user-selected focal parameters of the optical system in the headset and communicate these (via connection 110) to the base station 102. These parameters are then used to ensure that the rendering is performed correctly so that the images are correctly displayed to a user, in some cases in combination with other parameters such as those related to the operation of the base station 102.

Figure 1B:
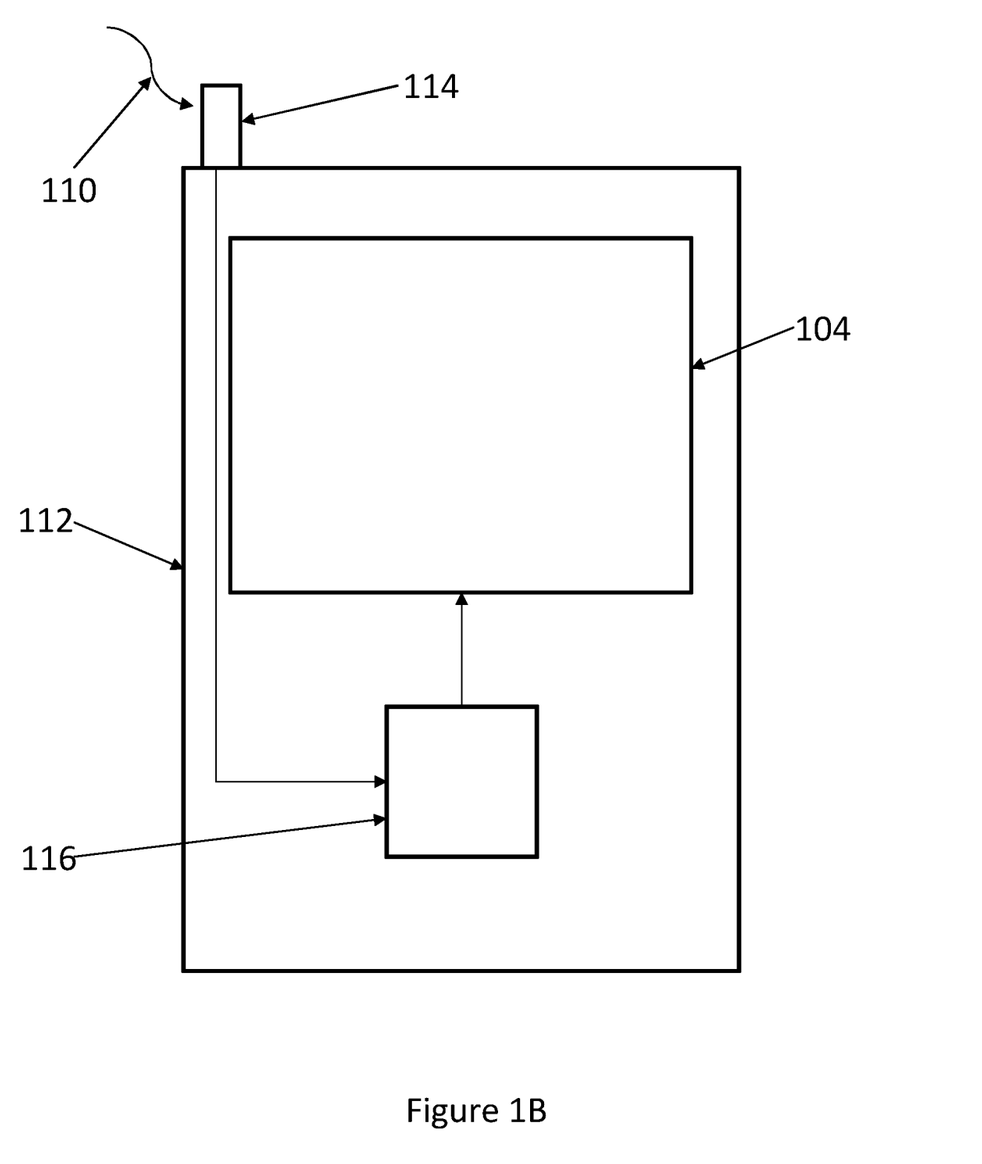
FIG. 1B shows a schematic of a smart phone visual display unit.

FIG. 1B shows a system which is similar in operation to the embodiment shown in FIG. 1A. In this case, however, there is no separate host device 102. The entire system is contained in a single casing 112, for example in a smartphone or other such mobile computing device. The device contains a processor 116, which generates display data for display on the integral display panel or screen 104, which can be thought of as a form of peripheral display unit.

In this case, the data for display may be provided from a remote source via a wireless communication 110, e.g. wireless internet or mobile telephony. Such data is received via antenna 114, which is subsequently fed to the processor. In the event that this wireless connection fails, a notification from the content provider may be displayed, consistent with the method set out below, correctly rendered and being as up to date as possible by using the method disclosed herein.

The mobile computing device may be mounted such that the screen 104 is held in front of the user's eyes as if it were the screen of a virtual reality headset. In some cases the display panel 104 is artificially split using a blank line of a single colour (e.g. black). Moreover, the screen may be held in place using a special frame or holder. The holder may include a central partition to prevent light from the right half of the screen 104 from entering the left eye and vice versa.

Moreover, the holder may include a lens system similar to that described above in relation to the VR/AR headsets. In this case, careful rendering of the images is important to ensure that the user sees the images in the manner intended.

Figure 1C:
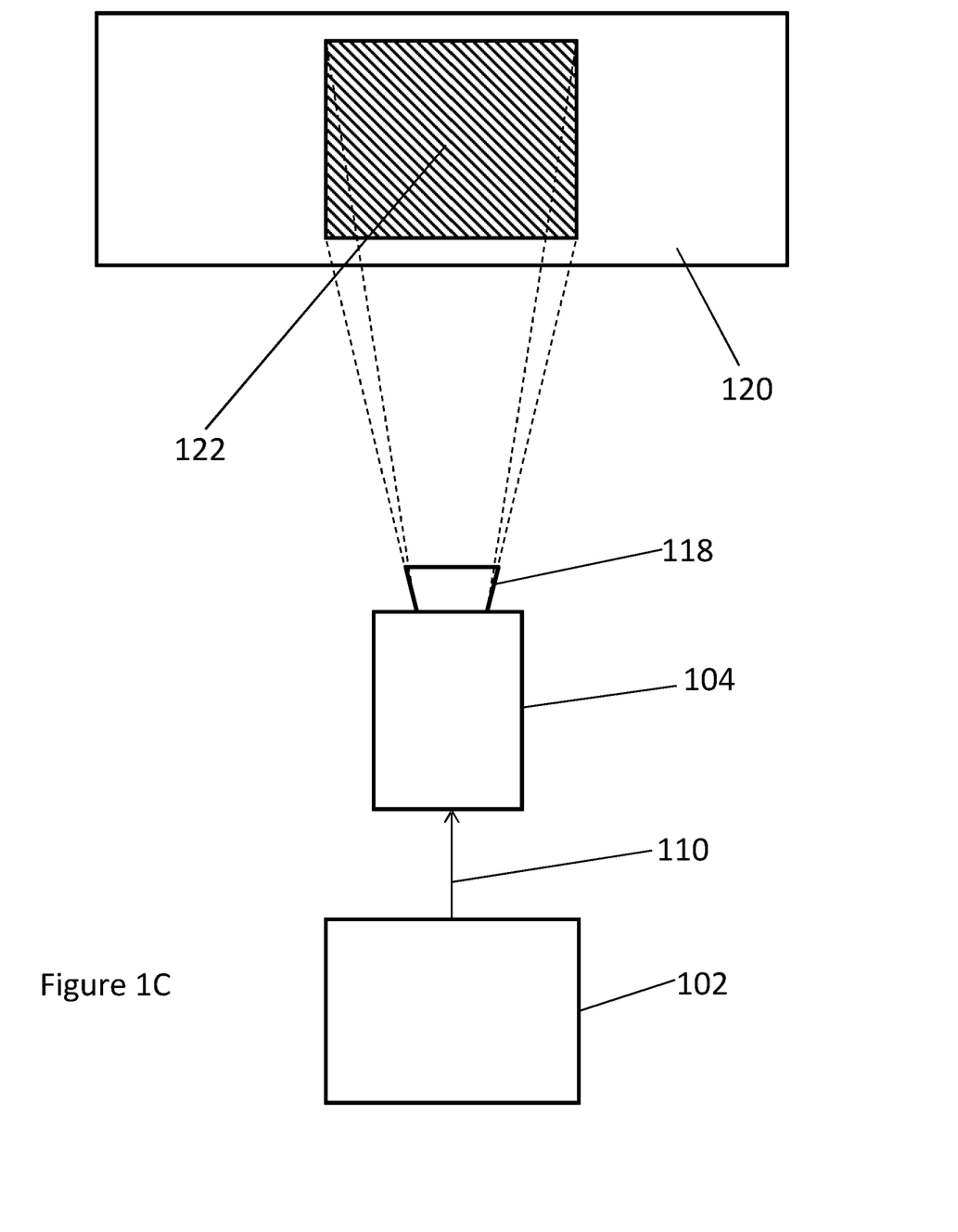
FIG. 1C shows a schematic of a projector visual display unit.

FIG. 1C shows yet a further example, in which the peripheral display unit is in the form of a projector 104. As in the previous examples, the projector 104 receives information for display from a base station 102, for example a host device such as a computer, gaming console, etc. Once more it is possible that the base station 102 is connected to a remote location e.g. via the internet or other network which supplies the data for display. Alternatively, the displayed data may be generated by the base station 102 itself, for example from installed software or a DVD or CD. In any event, the data for display is sent to the projector 104 via a communication link 110. The projector 104 projects the visual data for display onto a portion 122 of a suitable surface 120 (a special screen, or even a blank white portion of wall, for example), via projection optics 118.

The projection optics 118 create a similar problem to that set out above in respect of the VR/AR headset, specifically that it is typically desired that the image formed on the screen or wall is usually intended to be rectilinear. Depending on the arrangement in place, the projector 104 may not be positioned such that the optical axis is not perpendicular to the plane of the portion of the wall 122. Consequently, not only must the projection optics 118 bring the images into focus at the correct distance (i.e. the distance between the projector 104 and the wall 120), but must also adapt to the non-perpendicular arrangement between the optical axis and the surface 120. Finally, there will be portions, e.g. towards the edges of the image, which travel a further distance than those portions towards the centre of the image. This causes the image at those edge portions to spread out more, and thus to distort the preferred rectilinear shape of the displayed image. The projection optics 118 can be configured to correct this effect and ensure that the images are displayed in focus and in the desired size and shape.

As set out above the use of optical systems, while allowing the images to be presented in the desired format, can introduce other aberrations which affect the image quality. Consequently, the images sent to the projector 104 may be pre-rendered by the base station 102 (or even by a remote source which feeds the base station) so that by the time the images arrive at the portion of the surface 122, the additional distortion caused by the projection optics 118 cancels out the pre-rendering applied to the images and the images are displayed correctly, i.e. without distortion or aberration. The projector 104 may be configured to detect user-selected focal parameters of the projection optics 118 and communicate these (via connection 110) to the base station 102. These parameters can then be used to ensure that the rendering is performed correctly and that the images are correctly displayed.

In the event that it is necessary to display error or information messages, these too should be pre-rendered so that a user can correctly interpret the information being provided. As set out above (and will be described in more detail below), the base station 102 can be used to ensure that the information/error messages are correctly rendered, by using the optical parameters in much the same manner as it does to ensure that the visual data for display are correctly pre-rendered.

FIG. 2A shows a block diagram overview of a system according to the present disclosure, and provides a little more detail on how the systems in FIGS. 1A to 1C operate. A host computer 202 (e.g. a base station) is connected to a display control device 224, which is in turn connected to a display device 226. Collectively, display control device 224 and the display device 226 form a peripheral display unit, for example projector 104 or headset 104 described in detail above. The host 202 contains an application 228, which produces display data, by reading from a disc or onboard storage, receiving from an internet or network source, etc. At the same time as it is produced (or received), the data may also be pre-rendered by the application 228, consistently with the meaning of pre-rendering set out above. The display data may be produced and sent for compression either as complete frames or as canvasses, which may, for example, be separate application windows. In either case, they are made up of tiles of pixels, where each tile is a geometrically-shaped collection of one or more pixels.

The display data is sent to a compression engine 230, which may comprise software running in a processor or an appropriate hardware engine. The compression engine 230 first performs an encoding of the data, for example using a Haar transformation, to convert the data into a format that may then be further compressed, minimising data loss.

The compression engine 230 may then further compress the data and thereafter sends the compressed data to an output engine 232. The output engine 232 manages the connection 210 with the display control device 224 and in this example includes a socket for a cable to be plugged into for a wired connection to a corresponding input engine 236 on the display control device 224. The compression stage is useful because, since the context is one in which a high bandwidth between the base station 202 and the peripheral display unit 224, 226 cannot be guaranteed, minimising the amount of data to be sent can greatly improve the robustness of the system. In some examples, e.g. the self-contained system of FIG. 1B, there may be no need for compression/decompression within the self-contained unit, since the internal connections can be wired, meaning that there is less of an issue with bandwidth.

The connection 210 between the output engine 232 and the input engine 236 may include an unreliable portion 234 (or indeed the entire connection may be unreliable). This may happen in the form of an IP network having variable traffic, and consequently introducing a variable (and on occasion excessive) signal delay. Alternatively, the network may route via different routes which themselves have different bandwidths/delay times which can cause delays in data arriving, particularly when e.g. video frames are split into many parts before transmission and each part takes a different route and arrives at a different time. In other examples, the unreliable link may occur for more prosaic reasons; the cable of the connection may be physically damaged or noise may enter the system by way of RF pickup or other interference.

Figure 2B:
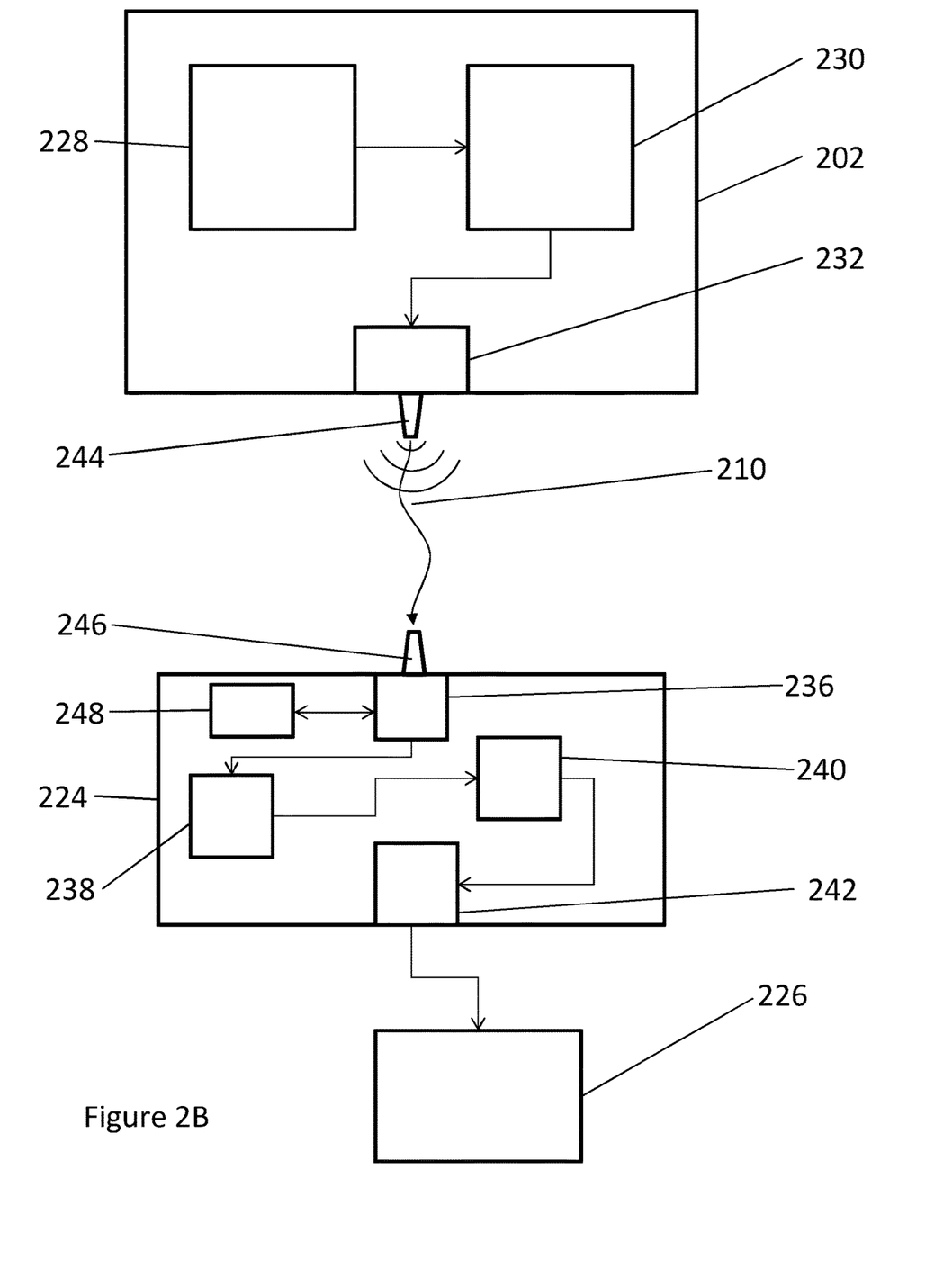
FIG. 2B shows a schematic of an alternative arrangement of a base station and a visual display unit.

In another example, shown in FIG. 2B, the system operates in much the same manner, with identical numbers representing features with the same general functionality. An application 228 is connected to a compression engine 230, which is subsequently connected to an output engine 232, all of which form part of the base station 202. A connection 210 to the peripheral display unit 224, 226 is provided which results in data being received at an input engine 236, which is subsequently fed to a decompression engine 238, then a scaler 240 and another output engine 242. The output engine 242 sends the data stream to the display device 226.

The difference between the system in FIG. 2A and the system in FIG. 2B is that the connection in FIG. 2A is a wired connection, while in FIG. 2B the connection 210 is a radio transmitter for a wireless connection. As shown, the output engine 232 is provided with a wireless communicator 244 for transmitting and/or receiving data to/from the peripheral display unit 224, 226 via electromagnetic radiation. Similarly, input engine 236 is provided with a wireless communicator 246 configured to transmit and receive signals to/from the base station 202.

Wireless communications can be unreliable for a number of reasons. Interference from other electromagnetic sources, movement of the source and/or receiver (to block the signal, move out of range, or move far from the axis a beam formed for the transmission of signals), or the presence of other objects (e.g. people) moving and blocking the signal can all result in a reduced bandwidth available, or indeed in the link failing entirely.

In any case, the data, once it arrives, is fed into the input engine 236, which is itself connected to a decompression engine 238. When it receives compressed data it sends it to the decompression engine 238 or to a memory from which the decompression engine 238 can fetch it according to the operation of a decompression algorithm. In any case, the decompression engine 238 may decompress the data, if necessary, and performs a decoding operation, optionally using a reverse Haar transform. In the illustrated system, the decompressed data is then sent to a scaler 240. In the case where the display data was produced and compressed as multiple canvasses, it may be composed into a frame at this point.

If scaling is necessary, it is preferably for it to be carried out on a display control device 224 as this minimises the volume of data to be transmitted from the host 202 to the display control device 224, and the scaler 240 operates to convert the received display data to the correct dimensions for display on the display device 226. In some embodiments, the scaler may be omitted or may be implemented as part of the decompression engine. The data is then sent to an output engine 242 for transmission to the display device 226. This may include, for example, converting the display data to a display-specific format such as VGA, HDMI, etc.

In some cases, the connection 210 comprises both wired and wireless portions such as those shown in FIGS. 2A and 2B.

In order to provide pre-rendered information messages to the peripheral display unit 224, 226, the messages must first be rendered to account for the display settings currently in use. This rendering can be performed in the same manner as the pre-rendering for the visual data to be displayed by the peripheral display unit 224, 226. For example, the application 228 may perform the rendering for the messages so that they can be correctly displayed. These can be transmitted from the base station 202 to the display control device 224 via wired or wireless connection 210. Once the pre-rendered information messages are received by the display control device 224, they are stored in a memory 248 until needed. For example, a particular status is detected (by the peripheral display unit 224, 226 and/or the base station 202) the display control device may be triggered to display the corresponding information/error message. This is displayed by the peripheral display unit 224, 226, irrespective of the presence or absence of the connection 210.

In each of the examples of FIGS. 2A and 2B, the display unit 224, 226 may comprise a VR adapter (e.g. unit 224) and a separate display device 226. This arrangement provides a separation between the signal receiving and decompression parts (224) and the display parts 226. A user can, for example, connect different headsets 226 to the same VR adapter 224. This allows a user to upgrade their headset, for example when a newer, higher-resolution version comes out, without needing to update other pieces of hardware. The present invention is particularly useful in this case, since the headset need not be integral to the VR adapter, thereby increasing the number of variables in the rendering process. Moreover, each headset may store its own pre-rendered messages locally, meaning that error messages (e.g. base station is expecting a different headset) can be displayed without the base station's involvement.

In particular, this sending of the correctly rendered messages may not be possible if the connection has failed (due to the various reasons for unreliability set out above, for example). Therefore, the system addresses this using the method shown in FIG. 3. This method begins at step 350 by detecting that a connection (e.g. connection 210) is present between a peripheral display unit and a base station. In the case of the system shown in FIG. 1B, the connection could be the wireless connection 110 through which data is streamed, and the base station could be a remote part of the mobile network, for example a content server. The messages for rendering and sending to the peripheral display unit may be provided originally (in a non-rendered format) from the peripheral display unit. That is the peripheral display unit may decide which messages it needs to have rendered, and then request that these be rendered for it to display. Additionally, or alternatively, the base station may propose messages for rendering and storage, for example to provide information for display in response to a specific base station status, or if the base station is in communication with a manufacturer via the internet new messages may be provided to the peripheral display unit.

Figure 3:
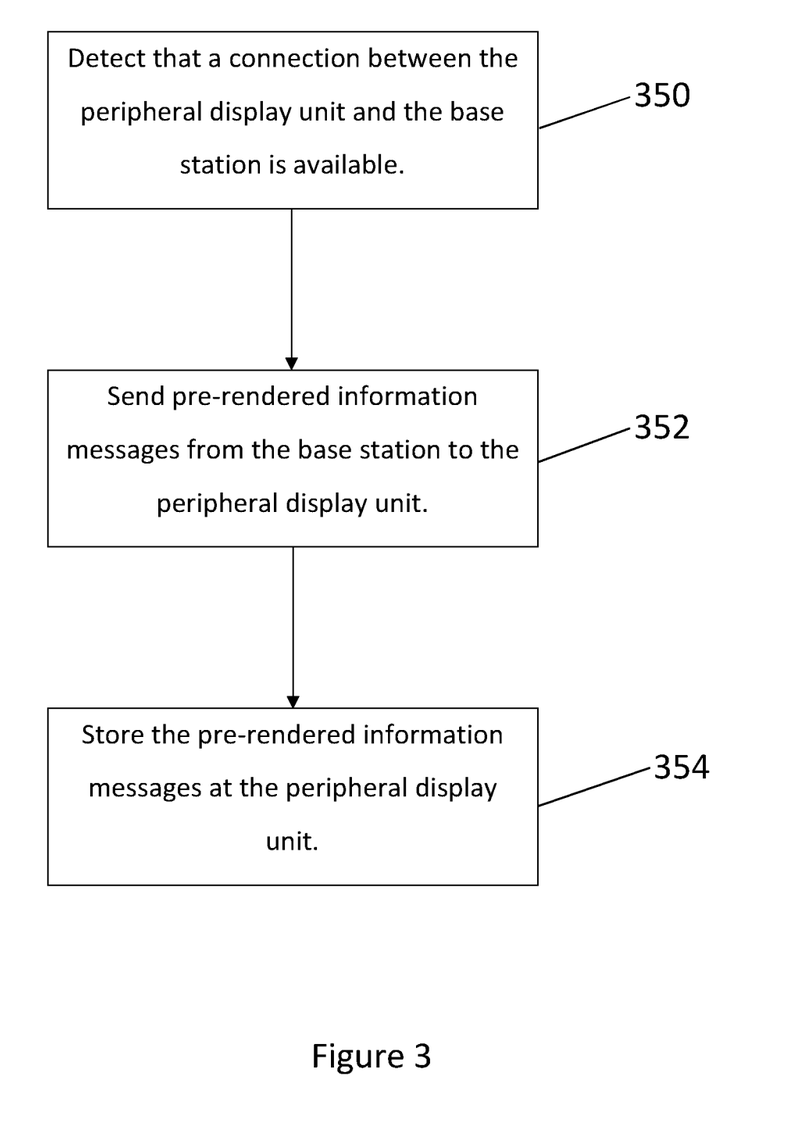
FIG. 3 shows a flow chart for implementing a method disclosed herein.

Once the connection has been detected, in step 352 the system sends pre-rendered information messages from the base station to the peripheral display unit.

Finally, in step 354, the system stored the pre-rendered information messages at the peripheral display unit. These messages can then be displayed in response to a status detected at the peripheral display unit. The storage at the peripheral display unit may comprise a memory, for example a non-volatile memory.

The invention claimed is:

1. A method for displaying information messages by a peripheral display unit, comprising:
    projecting a simulated environment on a display device associated with the peripheral display unit;
    receiving one or more pre-rendered information messages associated with one or more events, respectively, outside the simulated environment;
    storing the one or more pre-rendered information messages;
    detecting an occurrence of at least one of the one or more events; and
    projecting at least one of the one or more pre-rendered information messages on the display device responsive to detecting the occurrence of at least one event.

2. The method of claim 1, wherein the one or more pre-rendered information messages are received from a base station configured to pre-render one or more input images to produce the one or more pre-rendered information messages, and wherein each of the one or more pre-rendered information messages is pre-rendered to be displayed as virtual reality (VR) or augmented reality (AR) content.

3. The method of claim 2, wherein the pre-rendering is based at least in part on:
    a language setting of the base station;
    a language setting of the peripheral display unit one or more optical effects caused by one or more focal parameters of a lens system within the peripheral display unit;
    mura artefact effect;
    alignment of a display screen associated with the peripheral display unit in relation to a sight axis of a user of the peripheral display unit;
    a physical condition of the user's eyes; or
    a plurality of pixel values associated with an image currently being displayed or anticipated to be displayed by the peripheral display unit.

4. The method of claim 2, further comprising updating the stored one or more pre-rendered information messages in response to:
- the base station being initialised;
- the peripheral display unit being initialised;
- software for the base station being updated;
- software for the peripheral display unit being updated;
- a language setting for the base station being changed;
- a language setting for the peripheral display unit being changed;
- a graphical display setting being changed; or
- a change in a plurality of pixel values associated with an image currently being displayed by the peripheral display unit.

5. The method of claim 1, wherein the one or more pre-rendered information messages are stored in a non-volatile memory at the peripheral display unit.

6. The method of claim 1, wherein the one or more events include lack of connection, low bandwidth, loss of data, system damages, limitation in proximity, or fire alarms.

7. The method of claim 1, wherein the method is executed periodically.

8. A system for displaying one or more pre-rendered information messages, the system comprising:
- a base station;
- a peripheral display unit having a memory, wherein the peripheral display unit is configured to
  - project a simulated environment on a display device associated with the peripheral display unit;
  - receive one or more pre-rendered information messages associated with one or more events, respectively, outside the simulated environment;
  - store the one or more pre-rendered information messages in the memory;
  - detect an occurrence of at least one of the one or more events; and
  - project at least one of the one or more pre-rendered information messages on the display device responsive to the detected occurrence of at least one event.

9. The system of claim 8, wherein the base station is configured to pre-render one or more input images to produce the one or more pre-rendered information messages, wherein each of the one or more pre-rendered information messages is pre-rendered to be displayed as virtual reality (VR) or augmented reality (AR) content.

10. The system of claim 9, wherein the base station is configured to pre-render the one or more input images to produce the one or more pre-rendered information messages based at least in part on:
- a language setting of the base station;
- a language setting of the peripheral display unit;
- one or more optical effects caused by one or more focal parameters of a lens system within the peripheral display unit;
- mura artefact effect;
- alignment of a display screen associated with the peripheral display unit in relation to a sight axis of a user of the peripheral display unit;
- a physical condition of the user's eyes; or
- a plurality of pixel values associated with an image currently being displayed or anticipated to be displayed by the peripheral display unit.

11. The system of claim 8, wherein the one or more events include lack of connection, low bandwidth, loss of data, system damages, limitation in proximity, or fire alarms.

12. The system of claim 8, wherein the peripheral display unit is configured to update the stored one or more pre-rendered information messages in response to:
- the base station being initialised;
- the peripheral display unit being initialised;
- software for the base station being updated;
- software for the peripheral display unit being updated;
- a language setting for the base station being changed;
- a language setting for the peripheral display unit being changed;
- a graphical display setting being changed; or
- a change in a plurality of pixel values associated with an image currently being displayed by the peripheral display unit.

13. The system of claim 8, wherein the peripheral display unit receives the one or more pre-rendered information messages periodically.

14. The system of claim 8, wherein the system is configured to update the one or more pre-rendered information messages stored in the memory of the peripheral display unit in response to a change in the detected occurrence of at least one event.

* * * * *